July 19, 1938.   T. B. STILLMAN   2,124,215
SUPERHEATER BOILER
Original Filed July 12, 1935   6 Sheets-Sheet 2

INVENTOR
Thomas B. Stillman
BY
ATTORNEY

July 19, 1938.   T. B. STILLMAN   2,124,215
SUPERHEATER BOILER
Original Filed July 12, 1935   6 Sheets-Sheet 3

INVENTOR
Thomas B. Stillman
ATTORNEY

July 19, 1938.  T. B. STILLMAN  2,124,215
SUPERHEATER BOILER
Original Filed July 12, 1935   6 Sheets-Sheet 4
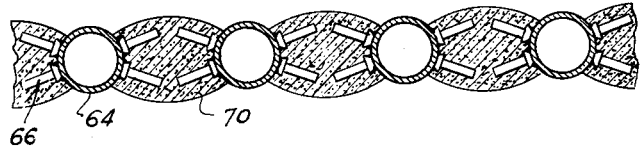
Fig. 6
Fig. 10
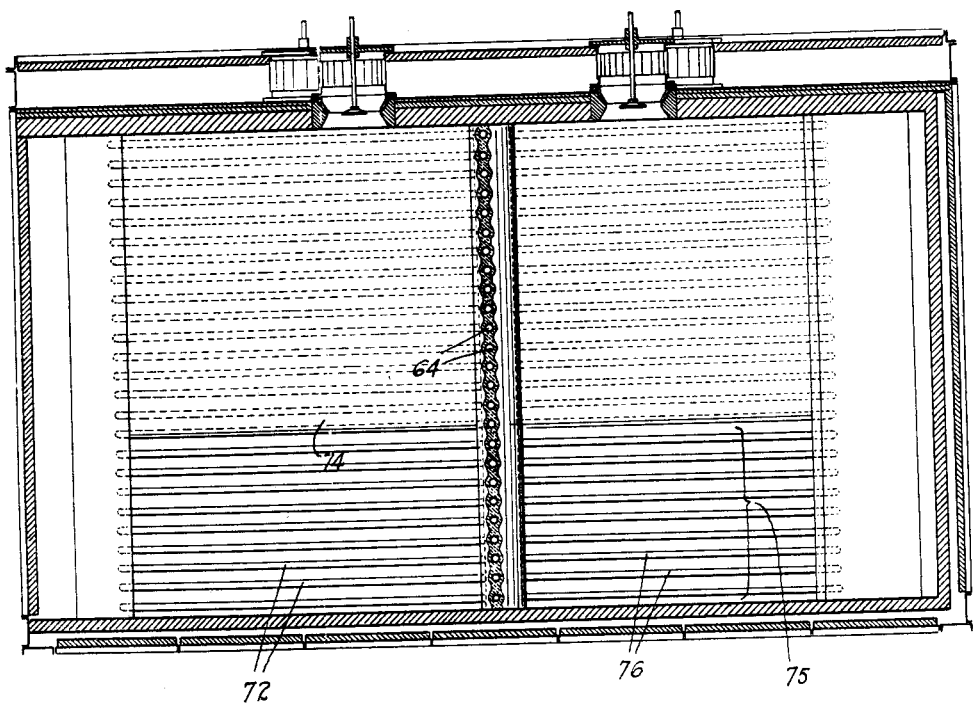
Fig. 5
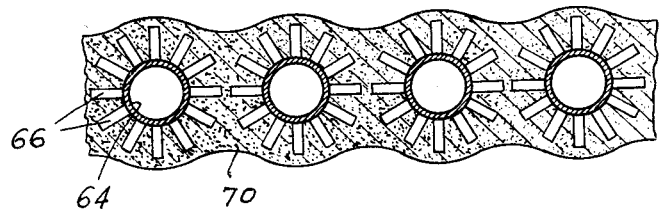
INVENTOR
Thomas B. Stillman
BY
ATTORNEY July 19, 1938.  T. B. STILLMAN  2,124,215
SUPERHEATER BOILER
Original Filed July 12, 1935    6 Sheets-Sheet 5

INVENTOR
Thomas B. Stillman
BY
ATTORNEY

Patented July 19, 1938

2,124,215

UNITED STATES PATENT OFFICE 2,124,215

SUPERHEATER BOILER

Thomas B. Stillman, South Orange, N. J., assignor to The Babcock & Wilcox Company, Newark, N. J., a corporation of New Jersey Original application July 12, 1935, Serial No. 30,950. Divided and this application July 31, 1937, Serial No. 156,637

4 Claims. (Cl. 122—473)

This invention relates to a method and apparatus for operating marine boilers and superheaters of the type disclosed in my co-pending application Serial No. 30,950, filed July 12, 1935, and of which this application is a division.

Recent developments affecting the Navy have demonstrated that critical limitations are imposed upon naval armament and operative effectiveness by certain steam generating practices. The use of low pressure and low superheat equipment is one example. Separate settings for independently fired superheaters and boilers illustrate another. Excessive tonnage limitations are imposed upon armament by the latter and an inferior operating and maneuvering effectiveness results from the former. It is an object of the invention to provide steam generating and superheating equipment the use of which eliminates such disadvantages.

By providing a separately fired high temperature superheater co-ordinated with a high pressure water tube steam boiler in a single boiler setting with two independently operating furnaces, the use of the invention results in a superior overall ship efficiency and maneuvering capacity. Also, effective control of superheat temperatures over the wide ranges of Navy and other marine requirements is gained without the necessity of employing auxiliary equipment such as desuperheaters, which impose additional weight limitations.

The invention will be described by reference to the accompanying drawings in which—

Fig. 5 is a partial transverse section through the studded tube inter-furnace wall.

Fig. 6 is a partial transverse section showing a modification of the inter-furnace wall in which a partially studded construction is employed.

Fig. 10 is a floor plan view showing some of the floor tubes bare and others covered with a refractory material.

Figure 1:
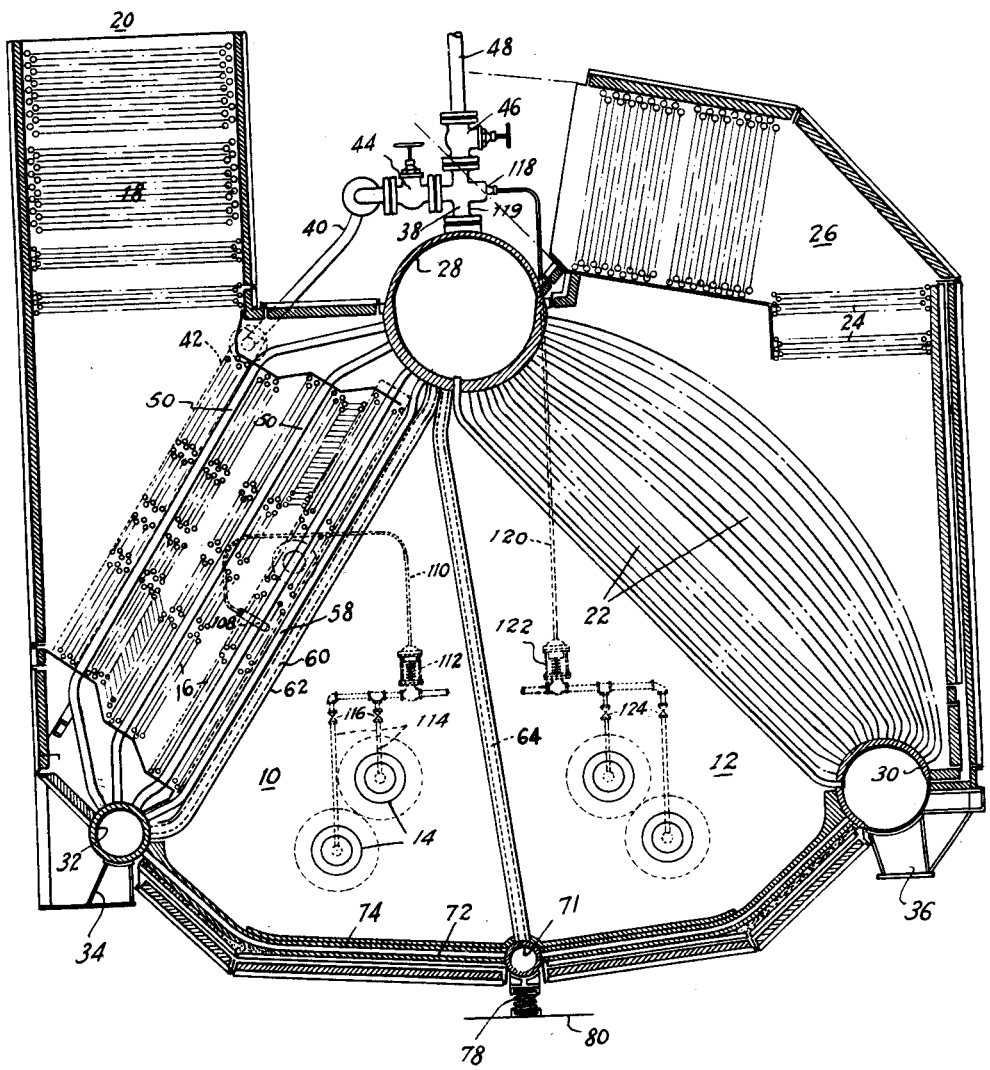
Fig. 1 is a view in the nature of a vertical section through the superheater furnace and the boiler furnace of a marine boiler.

The steam generator and superheater indicated in Fig. 1 of the drawings is for installation on shipboard where the steam coming from the fire rooms to the turbines may have a pressure of the order of 900# per square inch and a temperature of 900° F. It is inherently capable of such superheat control that it attains a close regulation of superheat over wide ranges independently of the rating at which the boiler is being operated. This is particularly advantageous under ship maneuvering conditions when superheats from 100° F. to 370° F. are desideratums according to the changes in ship operation. When a ship is operating at a reduced speed and the boiler is operating at a low capacity it is important from the viewpoints of cruising range and economy to maintain a high superheat, and the illustrative superheater boiler produces this result.

Fig. 1 indicates, in a single boiler setting, a superheater furnace 10 and a boiler furnace 12. The former is separately fired by the independently operable burners 14 and its furnace gases pass across the superheater 16 on their way through the air heater 18 to the flue 20. Hot gases from the boiler furnace 12 pass across the bank of steam generating tubes 22 and thence over the economizer 24 to the flue 26.

The illustrative boiler is a three drum boiler having a single steam separator drum 28. The remaining drums 30 and 32 are preferably bottom supported as shown, upon pedestals 34 and 36 which are secured at positions near the sides of the hold of a ship.

The separator drum or steam and water drum 28 is supported by the downwardly diverging groups of tubes which connect it with the lower drums. It therefore is free to move vertically as the temperature of the fluid in the tubes increases.

Steam from the separator drum may pass through the offtake 38 and the line 40 to the superheater header 42 if the valve 44 is open; or it may pass as saturated steam directly to a consumer, through the valve 46 and the line 48. This arrangement of elements is particularly adaptable to ship operating conditions. In port, saturated steam only may be used, and even under some operating conditions saturated steam may be employed. In some instances, the use of both saturated and superheated steam may be desired. This is permitted by the present boiler.

Figure 2:
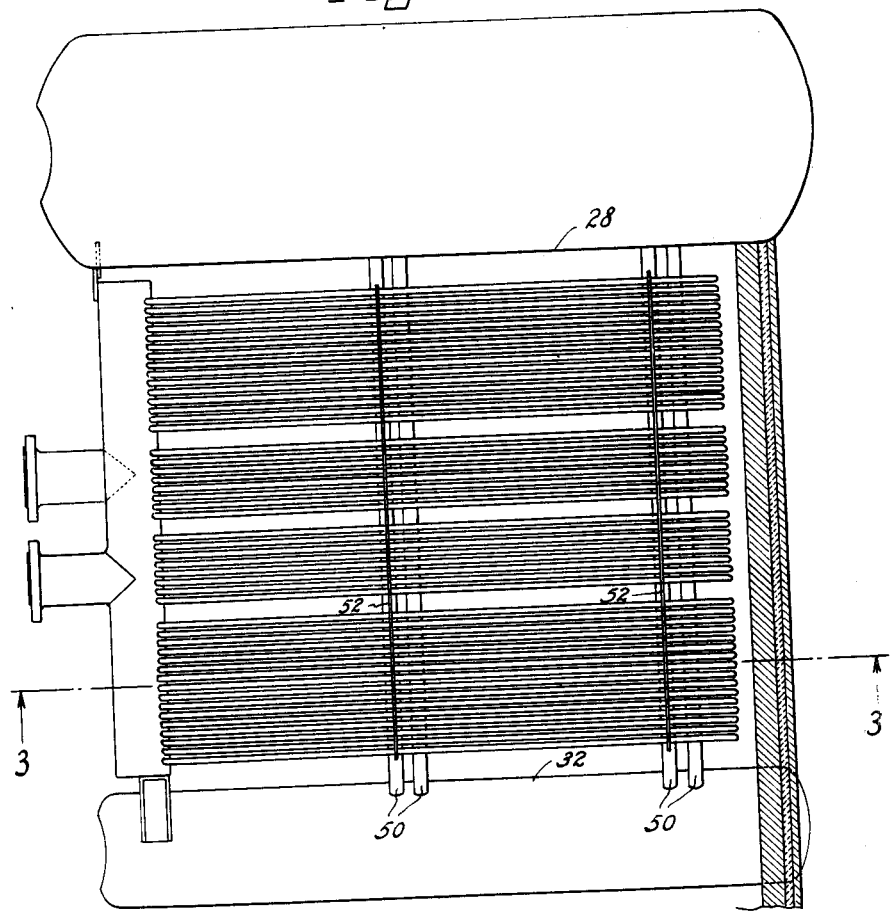
Fig. 2 is a view in the nature of an elevation, showing the superheater.
Figure 3:
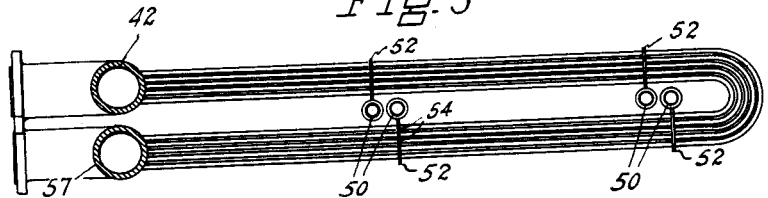
Fig. 3 is a detailed view showing one of the superheater sections in plan.
Figure 8:
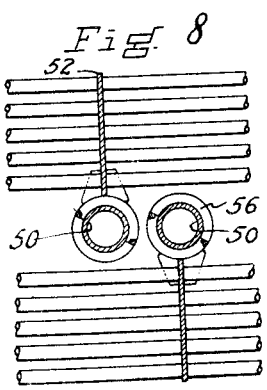
Fig. 8 is a detailed section showing the manner in which the superheater tubes are maintained in position from the large diameter tubes connected into boiler circulation.
Figure 9:
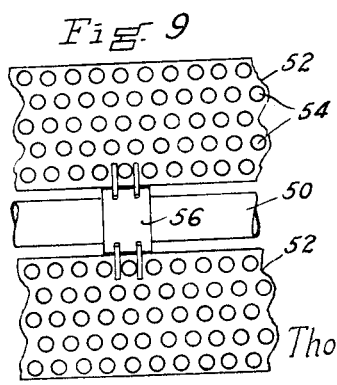
Fig. 9 is a detailed view of the superheater support, looking at the Fig. 8 construction at right angles thereto.

When the superheater consists of U-tube sections such as those indicated in Figs. 2 and 3 of the drawings it may be maintained in position by large diameter water tubes 50 communicating with the drums 28 and 32. Fig. 3 indicates these tubes in widely spaced pairs positioned between the legs of the U-tubes. Each tube has an apertured side plate 52 fixed thereto, and the U-tubes are inserted in apertures 54 during the construction of the boiler. Figs. 8 and 9 illustrate the manner in which these plates are secured to the tubes. As here shown, the plates are welded to collars 56 which encircle the tubes and may be movable relative thereto to compensate for differential expansions and contractions.

Fig. 3 further indicates each superheater section as having a plurality of nested U-tubes all of which communicate with separate inlet and outlet headers at their ends. At one end of the particular section here shown, one leg of each U-tube is connected to the inlet header 42, and at the other end, the other legs are connected to the outlet header 57. The latter header of the first section may be directly connected to the inlet header of the similarly formed succeeding section and similar connections made throughout the entire superheater.

Fig. 1 shows the superheater 16 protected against overheating damage by the rows of screen tubes 58 and 60, the latter of which may have refractory coverings indicated at 62. The furnace wall tubes 64 may be similarly covered. Two forms of the covering for the latter are indicated in Figs. 5 and 6. In both, refractory material fills the spaces between the tubes to complete the wall. The wall 62 is preferably not a closed or complete wall, while the covered tubes 64 form a closed or complete wall.

In the Fig. 6 modification, the tubes 64 have headed metallic studs 66 welded thereto with their heads at their tube ends. They preferably extend radially from the tubes although in some instances some of the studs may be otherwise arranged. In the Fig. 6 modification, for example, there are studs 66 only in the spaces between successive tubes, and the refractory material 70 preferably installed as a plastic, is correspondingly positioned.

When the inter-furnace wall is constructed according to the Fig. 5 modification in a high temperature zone, the wall tubes 64 permit higher boiler capacity. Higher furnace temperatures are also promoted. In ignition zones, complete combustion is attained at an early stage in the path of furnace travel. Heat radiantly transmitted from the incandescent refractory material contributes to this result.

The Fig. 6 modification is adapted for lower temperature zones, or lower temperature furnace conditions, the tubes being partially bare.

The wall tubes 64 connect the floor header 71 with the water space of the drum 28 and are maintained in a boiler circulation circuit by a tubular connection between the drum 32 and the header 71. Thus, the inter-furnace wall may be as thin as shown (in the interest of increased furnace volume and low weight) and yet be adequately protected so as to minimize boiler "outage". "Water hammer" is also prevented.

In the illustrative boiler, floor tubes 72 connect the header 71 and the drum 32. They are inclined as shown and may be covered over a part of the furnace with refractory material 74. When parts of the floor tubes are bare, (as indicated at 75 in Fig. 10) the furnace is cooler, the remaining and covered parts acting to insure proper circulation.

When the floor of the boiler furnace is to be cooled, floor tubes 76 connect the drum 30 to the header 71, thus tying the inter-furnace wall and its tubes 64 in operative relation. The boiler furnace floor is then constructed in a manner similar to the above described construction of the superheater furnace floor.

The spring 78 interposed relative to the fixed base 80 and the header 71 has a furnace floor supporting function. It is not intended to put the tubes 64 under longitudinal compression, but rather to prevent excessive tension stresses on these tubes (due to their floor connection) from causing damage, especially by inertia when the boiler rises and falls due to the action of waves on the ship.

Figure 7:
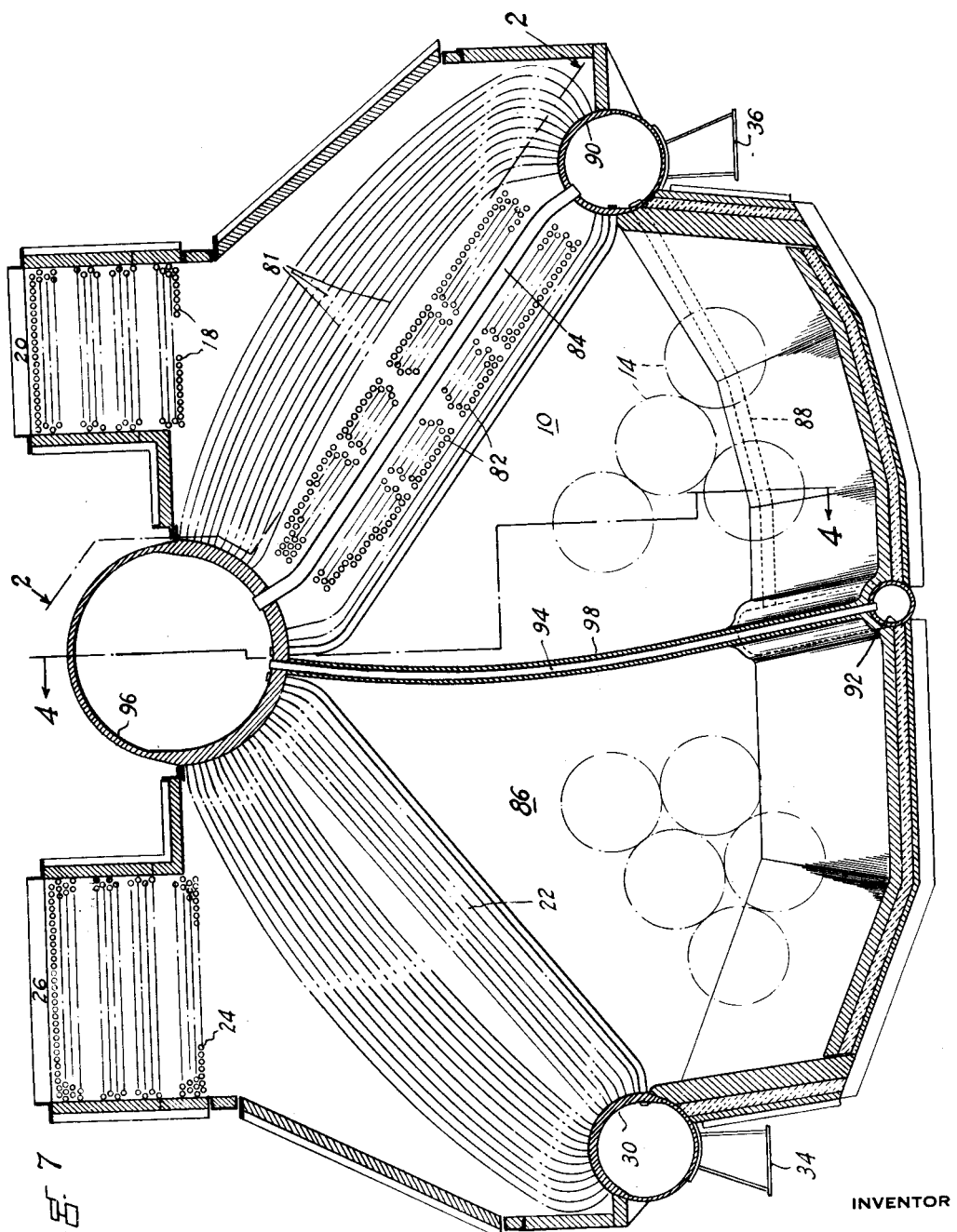
Fig. 7 is a view in the nature of a transverse section showing another modification of the marine boiler having independently fired boiler and superheater furnaces within the same boiler setting.

The modification of the invention represented by the boiler indicated in Fig. 7 is of a design similar to that shown in Fig. 1. Here, there are greater water storage and greater steaming capacities, due to the several rows of steam generating tubes 81 which are positioned rearwardly of the superheater 82. The latter is supported from the single row of larger diameter tubes 84, and is generally of the same construction as the superheater in the Fig. 1 boiler. The furnace floors, however, do not have floor cooling tubes, but there is a circulatory connection 88 which affords communication between the drum 90 and the floor header 92. This connection 88 has the effect of facilitating the maintenance of uniform water temperatures—and more especially in the tube bank above the idle furnace. The tubes 94 connecting the latter directly with the water space of the drum 96 have a refractory covering 98 and are preferably bowed as shown. Furthermore, these tubes, and the wall formed thereby are protected against overheating by a metallic stud construction such as that shown in Fig. 5, or Fig. 6, or both, the latter being used near the upper ends of the tubes.

Figure 4:
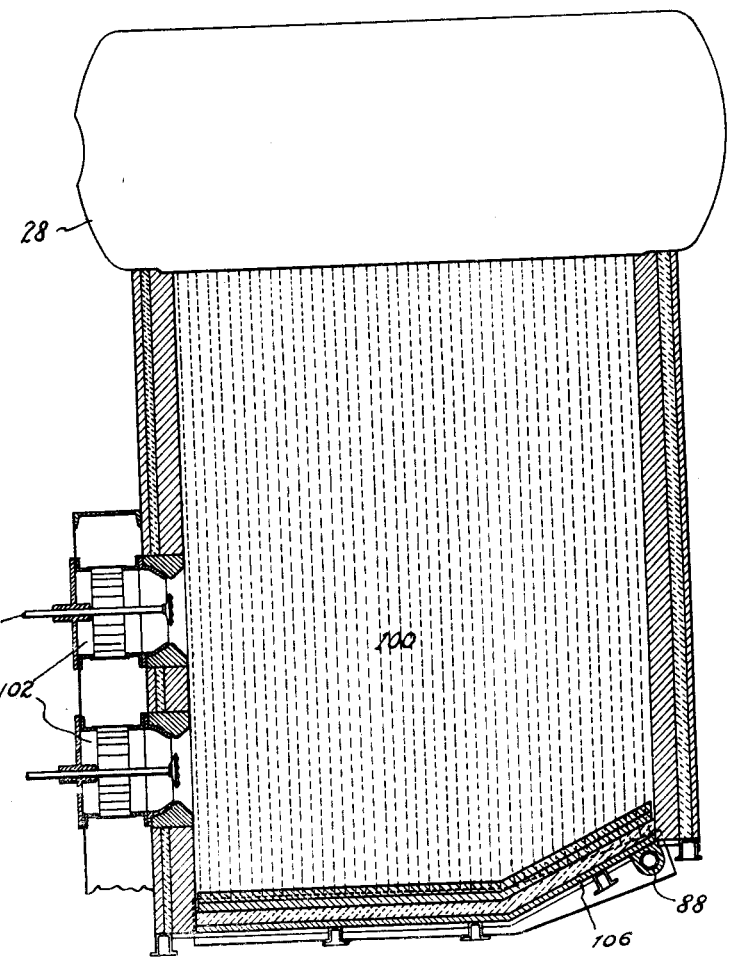
Fig. 4 is a section taken on the line 4—4 of Fig. 7.

Fig. 4 indicates the burners 102 for the superheater furnace 100, having fuel conducting means 104. This figure also shows the circulatory connection 88 positioned beneath the inclined portion 106 of the furnace 100.

When the burners 14 are controlled according to the superheat an automatic control system such as indicated in Fig. 1 may be employed. This system includes a temperature responsive element 108 which is located in the outlet of the superheater. This is connected by a fluid line 110 to a diaphragm operated valve 112, or other mechanism for operating valves in fuel lines of the burners. In addition, the separate fuel lines 114 leading to the individual burners may be supplied with separate hand operated valves 116.

When the operation of the boiler furnace is automatically controlled a pressure responsive element is employed. This may be installed in the saturated steam space. In Fig. 1 such an element is shown at 118, mounted in the T 119. It is connected by a fluid line 120 with valve operating mechanism 122 which may be similar to the valve operating mechanism for the burners of the superheater furnace. When this valve controls the fuel supply line which is common to a plurality of the burners separate hand operated valves 124 in the individual fluid lines may be employed.

The air supply lines to the burners may be also automatically pressure or thermally controlled, by systems which are similar to those described in the preceding paragraphs.

Figure 11:
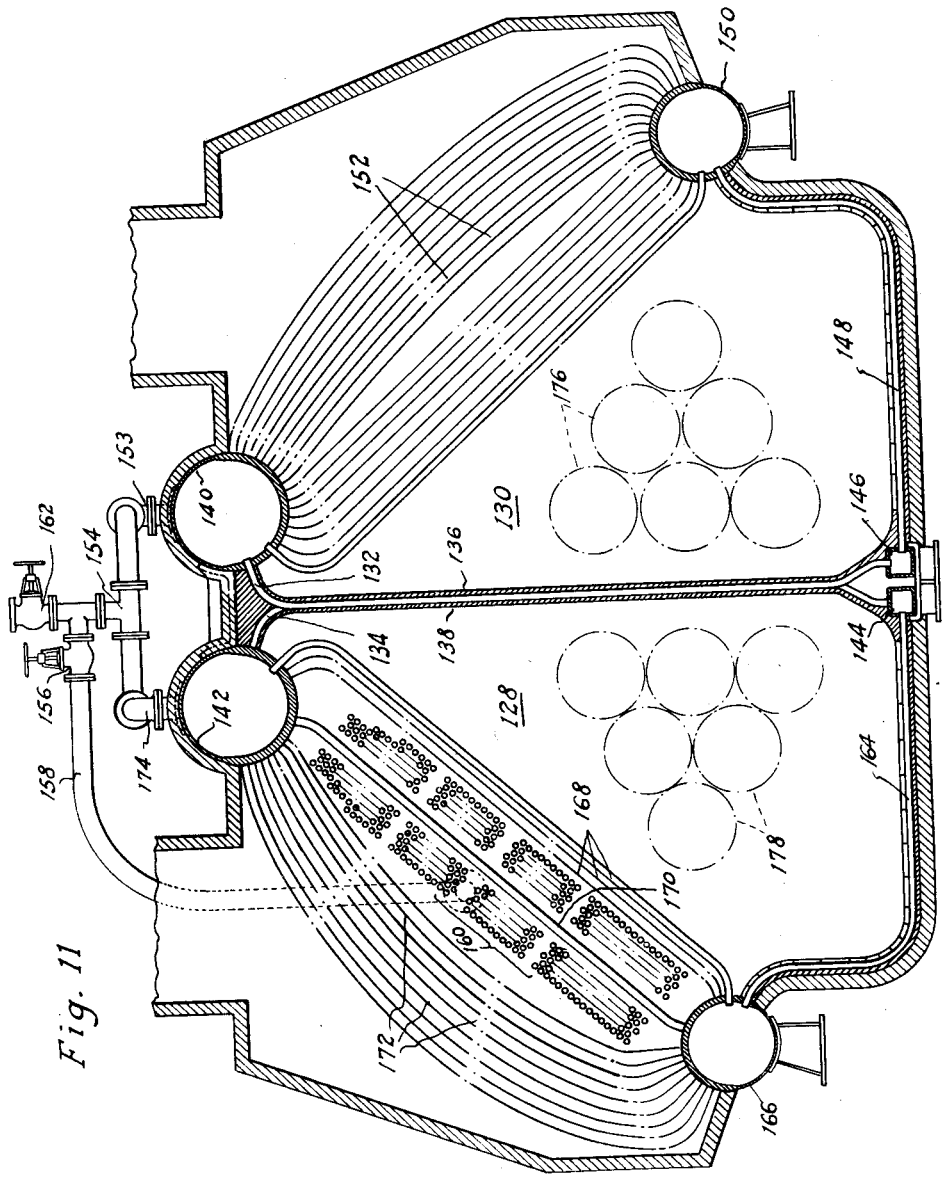
Fig. 11 is a view in the nature of a vertical transverse section of another steam boiler.

Referring to the boiler shown in Fig. 11 of the drawings there are two furnaces 128 and 130 separated by wall tubes 132 and 134. The latter are connected into the circulation of the left hand boiler, and the former with the circulation of the right hand boiler. Preferably the interfurnace wall includes the wall tubes in a single row, and has metallic studs welded to the tubes and extending radially therefrom through the refractory lines 136 and 138. The wall tubes connected to the drums 140 may be the odd numbered tubes, the intermediate tubes being connected to the boiler drum 142.

The separate sets of the wall tubes 132 and 134 are separated at their lower portions where they are separately connected to headers 144 and 146. Floor tubes 148 lead from the header 146 to the lower drum 150. The latter is connected by a bank of steam generating tubes 152 to the drum 140. Steam is conducted from the latter drum through the offtake 153 to a union 154 from which the steam may be led through the valve 156 and the line 158 to the superheater 160, or it may pass as saturated steam through the valve 162 to a point of use.

From the floor header 144 the wall tubes 164 lead to the drum 166. This drum is connected to the drum 142 by screen tubes 168 and superheater supporting tubes 170. Rearwardly of the superheater 160 the steam generating tubes 172 connect to the drums 142 and 166. Steam from the drum 142 passes through the offtake 174 to the union 154.

The furnace 130 is fired by a number of fuel burners herein shown as the oil burners 176. The other furnace 128 is fired by the oil burners 178.

What is claimed is—

1. The method of operating a vapor generator having a plurality of groups of generating surfaces, at least one of which groups separates combustion spaces into independently fired chambers, one of which has an associated superheater, which comprises regulating the firing of the chamber with the superheater for desired vapor temperature, regulating the firing of the other chamber for desired pressure, and utilizing the products of combustion of each of the chambers in heat transfer relation to more than one of the groups of generating surfaces.

2. The method of operating a vapor generator having a plurality of groups of generating surfaces, at least one of which group separates combustion spaces into independently fired chambers, one of which has an associated superheater, which comprises regulating the firing of the chamber with the superheater from an indication of superheat, regulating the firing of the other chamber from an indication of load, and utilizing the products of combustion of each of the chambers in heat transfer relation to more than one of the groups of generating surfaces.

3. The method of operating a vapor generator having a plurality of groups of generating surfaces, at least one of which group separates combustion spaces into independently fired chambers, one of which has an associated superheater, which comprises regulating the firing of the chamber with the superheater from an indication of output quality of a portion of the total vapor generated, regulating the firing of the other chamber from an indication of an output variable, and utilizing the products of combustion of each of the chambers in heat transfer relation to more than one of the groups of generating surfaces.

4. The method of operating a vapor generator having a plurality of groups of generating surfaces, at least one of which group separates combustion spaces into independently fired chambers, one of which has an associated superheater, which comprises regulating the firing of the chamebr with the superheater for desired superheat while passing only a portion of the generated vapor through the superheater, regulating the firing of the other chamber for substantially the total desired generator load, and utilizing the products of combustion of each of the chambers in heat transfer relation to more than one of the groups of generating surfaces.

THOMAS B. STILLMAN.